(12) United States Patent
Chang

(10) Patent No.: US 6,982,881 B2
(45) Date of Patent: Jan. 3, 2006

(54) CURRENT DETECTING CIRCUIT AND POWER CONVERTER HAVING THE SAME

(75) Inventor: Shih-Hsien Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 10/984,211

(22) Filed: Nov. 9, 2004

(65) Prior Publication Data

US 2005/0207183 A1  Sep. 22, 2005

(30) Foreign Application Priority Data

Mar. 17, 2004  (TW) .............................. 93107108 A

(51) Int. Cl.
*H02M 3/335*  (2006.01)

(52) U.S. Cl. ......................................... 363/17; 363/97

(58) Field of Classification Search .................. 363/16, 363/17, 40, 56.02, 74, 78, 95, 97, 131, 132
See application file for complete search history.

(56) References Cited

U.S. PATENT DOCUMENTS

| 4,283,759 A | * | 8/1981 | Koiki .......................... 363/19 |
| 6,314,005 B1 | * | 11/2001 | Nishi et al. ............... 363/21.08 |
| 6,914,789 B2 | * | 7/2005 | Kinoshita et al. ........ 363/21.12 |

* cited by examiner

*Primary Examiner*—Adolf Berhane
(74) *Attorney, Agent, or Firm*—Madson & Metcalf

(57) ABSTRACT

A current detecting circuit for use in a power converter having a control circuit, a switching circuit, a transformer and an energy storage element is disclosed. The current detecting circuit comprises a filter, a rectifier and a differentiator. The filter is electrically connected to the energy storage element for receiving a voltage signal from the energy storage element and filtering the voltage signal to obtain an alternating voltage change value. The rectifier is electrically connected to the filter for rectifying the alternating voltage change value to obtain a half-sine wave voltage change value. The differentiator is electrically connected to the rectifier and the control circuit for performing a differential operation on the half-sine wave voltage change value to obtain a current change value of the energy storage element. The current change value is compared with a predetermined reference value stored in the control circuit so as to dynamically control the switching status of the switching circuit according to the comparing result.

17 Claims, 6 Drawing Sheets

CURRENT DETECTING CIRCUIT AND POWER CONVERTER HAVING THE SAME

FIELD OF THE INVENTION

The present invention relates to a current detecting circuit, and more particularly to a current detecting circuit for use in a power converter. The present invention also relates to a power converter having such a current detecting circuit.

BACKGROUND OF THE INVENTION

With increasing development of technology, computers become essentials of our lives. As common electrical appliances, reliable and stable power is necessary for activating the computers. As known, a power supply apparatus is widely employed to convert an alternating current (AC) from a regular plug into a direct current (DC) to be used by the computer. For a purpose of maintaining desirable performance of the computer, the power supply apparatus should meet with specified requirements and specifications associated with safety, reliability, protection, EMC (electromagnetic compatibility), etc.

Referring to FIG. 1(a), a functional block diagram of a conventional power supply apparatus is shown. The power supply apparatus comprises a rectifier 11 and a DC-to-DC converter 12. An input AC voltage Vin received by the rectifier 11 is firstly rectified to a high DC voltage V, which is then converted by the DC-to-DC converter 12 into a low DC voltage Vout. The low DC voltage Vout is outputted to be used by a load 13 such as an electrical appliance.

FIG. 1(b) is a schematic circuit diagram of the DC-to-DC converter in FIG. 1(a). The DC-to-DC converter 12 is a half-bridge converter, which comprises a control chip 121, a current transformer (CT) 122, a transformer 123, a rectifier 124, a filter 125, switching transistors Q1 and Q2, and a capacitor 126.

It is found that the secondary winding of the transformer 123 induces the voltage when a current change in the primary winding of the transformer 123 takes place. In addition, the induced voltage will be further processed by the rectifier 124 and the filter 125 so as to provide the low DC voltage Vout in proportion to the turn ratio of the transformer 123 to the load 13. By controlling the discharging action of the capacitor 126 at the primary winding of the transformer 123, the purpose of inducing the secondary winding of the transformer 123 will be achieved accordingly.

Generally, the control chip 121 is utilized to control the switching statuses of the transistors Q1 and Q2. For example, when the transistor Q1 is conducted but the transistor Q2 is shut, the high DC voltage V will charge the capacitor 126 via the transistor Q1, the current transformer 122 and the primary winding of the transformer 123 sequentially. As shown in FIG. 1(c), when the current flowing through the capacitor 126 reaches the peak value $I_1$, the control chip 121 will turn off the transistor Q1 but turn on the transistor Q2, and then, the capacitor 126 is discharged via the primary winding of the transformer 123 and the transistor Q2 until the current flowing through the capacitor 126 reaches the peak value $I_2$. Again, the transistor Q1 is conducted but the transistor Q2 is shut to charge the capacitor 126, and successively the transistor Q1 is shut but the transistor Q2 is conducted to discharge the capacitor 126. The charging/discharging procedures are continuously performed, thereby resulting in current change at the primary winding of the transformer 123. Accordingly, the low DC voltage Vout is produced from the secondary winding of the transformer 123.

As known from the above description, the control chip 121 should dynamically detect the current flowing through the capacitor 126, and compare the detected current with a predetermined reference value. According to the comparing result, the switching statuses of the transistors Q1 and Q2 are dynamically controlled. Referring again to FIG. 1(b), the current flowing through the capacitor 126 is dynamically detected by the current transformer 122, which is electrically connected to the transistors Q1 and Q2, the control chip 121 and the primary winding of the transformer 123. The detected current signal is transmitted to the control chip 121 for comparison.

Please refer to FIG. 1(d). Another conventional DC-to-DC converter applied to the circuit of FIG. 1(a) is illustrated. The DC-to-DC converter of FIG. 1(d) also comprises a control chip 121, a transformer 123, a rectifier 124, a filter 125, switching transistors Q1 and Q2, and a capacitor 126. The main difference of the circuit in FIG. 1(d) is that a resistor R is connected to the capacitor 126 in series. The resistor R is also electrically connected to the control chip 121 in order to measure a voltage drop across the resistor R, i.e. Vc. The current flowing through the capacitor 126 can be deduced from the equation Ic=Vc/R. This detected current signal Ic is transmitted to the control chip 121 for comparison. The operation principles of the control chip 121, the transformer 123, the rectifier 124, the filter 125, the switching transistors Q1 and Q2, and the capacitor 126 included therein are similar to those shown in FIG. 1(b), and are not redundantly described herein.

The above-mentioned DC-to-DC converters have some drawbacks. For example, the DC-to-DC converter of FIG. 1(b) is not cost-effective due to provision of the current transformer 122, which is disadvantageous for competition in the market. Although the DC-to-DC converter of FIG. 1(d) is not expensive, a large energy loss is resulted from the resistor R, which is power-consuming.

Therefore, it is needed to provide a current detecting circuit that can solve the drawbacks in the prior art.

SUMMARY OF THE INVENTION

The present invention provides a current detecting circuit with cost-effectiveness and reduced energy loss.

The present invention also provides a power converter having such a current detecting circuit.

In accordance with a first aspect of the present invention, there is provided a current detecting circuit for use in a power converter having a control circuit, a switching circuit and an energy storage element. The current detecting circuit comprises a filter, a rectifier and a differentiator. The filter is electrically connected to the energy storage element for receiving a voltage signal from the energy storage element and filtering the voltage signal to obtain an alternating voltage change value. The rectifier is electrically connected to the filter for rectifying the alternating voltage change value to obtain a half-sine wave voltage change value. The differentiator is electrically connected to the rectifier and the control circuit for performing a differential operation on the half-sine wave voltage change value to obtain a current change value of the energy storage element. The current change value is compared with a predetermined reference value stored in the control circuit so as to dynamically control the switching status of the switching circuit according to the comparing result.

In an embodiment, the power converter is a DC-to-DC converter, preferably a half-bridge converter.

Preferably, the energy storage element is a capacitor.

In an embodiment, the filter is a high pass filter (HPF) including another capacitor and a resistor, the rectifier is a diode, and the differentiator is an operational amplifier.

In accordance with a second aspect of the present invention, there is provided a power converter. The power converter comprises a switching circuit, a transformer, an energy storage element, a control circuit and a current detecting circuit. The switching circuit receives a first voltage. The transformer is electrically connected to the transformer. The energy storage element is electrically connected to the transformer. The control circuit is electrically connected to the switching circuit. The current detecting circuit comprises a filter, a rectifier and a differentiator. The filter is electrically connected to the energy storage element for receiving a voltage signal from the energy storage element and filtering the voltage signal to obtain an alternating voltage change value. The rectifier is electrically connected to the filter for rectifying the alternating voltage change value to obtain a half-sine wave voltage change value. The differentiator is electrically connected to the rectifier and the control circuit for performing a differential operation on the half-sine wave voltage change value to obtain a current change value of the energy storage element. The current change value is compared with a predetermined reference value stored in the control circuit so as to dynamically control the switching status of the switching circuit according to the comparing result. In response to the current change value, a second voltage is produced from the transformer.

In an embodiment, the transformer comprises a primary winding and a secondary winding. The primary winding is electrically connected to the switching circuit, the energy storage element and the current detecting circuit. The secondary winding produces a second voltage.

In an embodiment, the power converter further comprises another rectifier and another filter electrically connected to the secondary winding of the transformer so as to rectify and filter the second voltage and produce an output voltage.

Preferably, the energy storage element is a capacitor.

In an embodiment, the switching circuit comprises a first switching transistor and a second switching transistor. When the first switching transistor is conducted but the second switching transistor is shut, the capacitor is charged. When the first switching transistor is shut but the second switching transistor is conducted, the capacitor is discharged.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2A:
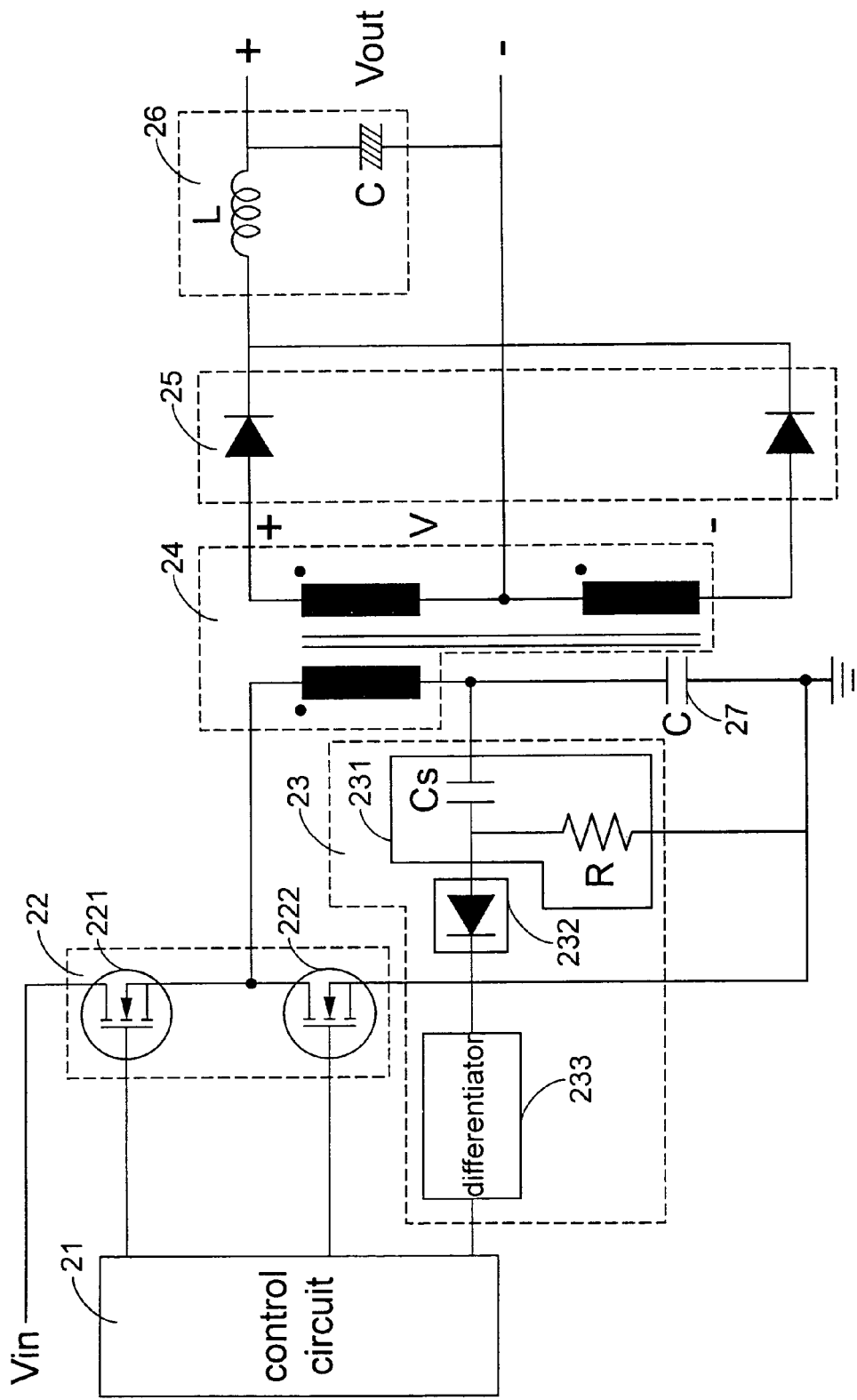
FIG. 2(a) is a circuit diagram of a power converter according to a preferred embodiment of the present invention.

Referring to FIG. 2(a), a power converter according to a preferred embodiment of the present invention is shown. The power converter is a DC-to-DC converter, preferably a half-bridge converter for converting a high DC voltage Vin into a low DC voltage Vout. The DC-to-DC converter of the present invention comprises a control circuit 21, a switching circuit 22, a current detecting circuit 23, a transformer 24, a rectifier 25, a filter 26 and an energy storage element 27 such as a capacitor. The switching circuit 22 comprises a first switching transistor 221 and a second switching transistor 222 connected in series. The primary winding of the transformer 24 is connected to the switching circuit 22, the energy storage element 27 and the current detecting circuit 23. The secondary winding of the transformer 24 is connected to the rectifier 25.

The current detecting circuit 23 is connected to the control circuit 21, the primary winding of the transformer 24 and the capacitor 27. The current detecting circuit 23 comprises a filter 231, a rectifier 232 and a differentiator 233. By detecting a voltage change value across the capacitor 27, the information relating to the current change of the capacitor 27 is obtained and provided to the control circuit 21 for comparison.

Figure 2B:
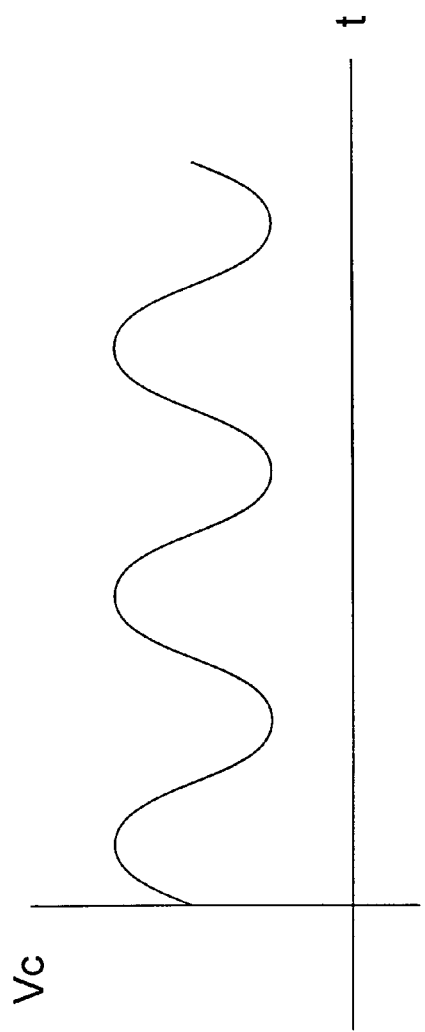
FIG. 2(b) is a timing diagram of waveform illustrating a voltage signal across the energy storage element of FIG. 2(a)
Figure 2C:
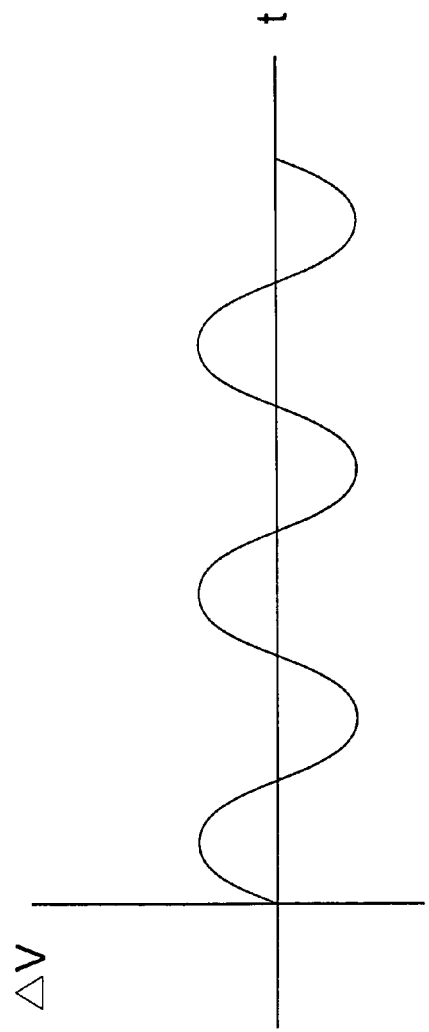
FIG. 2(c) is a timing diagram of waveform illustrating an alternating voltage change value $\Delta V$ obtained by filtering the voltage signal of FIG. 2(b).

In this embodiment, the filter 231 of the current detecting circuit 23 is a high pass filter (HPF) including a capacitor Cs and a resistor R connected in series. The DC component of a voltage signal Vc across the capacitor 27 (as shown in FIG. 2(b)) is filtered off by the filter 231, thereby obtaining an alternating voltage change value $\Delta V$ associated with the capacitor 27, as shown in FIG. 2(c).

The rectifier 232 is preferably a diode for receiving and rectifying the alternating voltage change value $\Delta V$, thereby obtaining a half-sine wave voltage change value. The current flowing through the capacitor 27 can be deduced from the equation $Ic=(dv/dt) \times C$, where C is the capacitance of the capacitor 27. By using the differentiator 233, such as an operational amplifier, to perform a differential operation on the half-sine wave voltage change value, the current flowing through the capacitor 27 is obtained. This detected current change value Ic is then transmitted to the control circuit 21 for comparison with a predetermined reference value, and the switching circuit 22 can be further controlled according to the comparing result. In this embodiment, the differentiator 233 is arranged in the current detecting circuit 23. Alternatively, the differentiator 233 can be included in the control circuit 21.

The control circuit 21 is electrically connected to the first switching transistor 221, the second switching transistor 222 and the current detecting circuit 23. The current detected by the current detecting circuit 23 is compared with a predetermined reference value. According to the comparing result, the switching statuses of the first switching transistor 221 and the second switching transistor 222 are dynamically controlled.

Figure 1A:
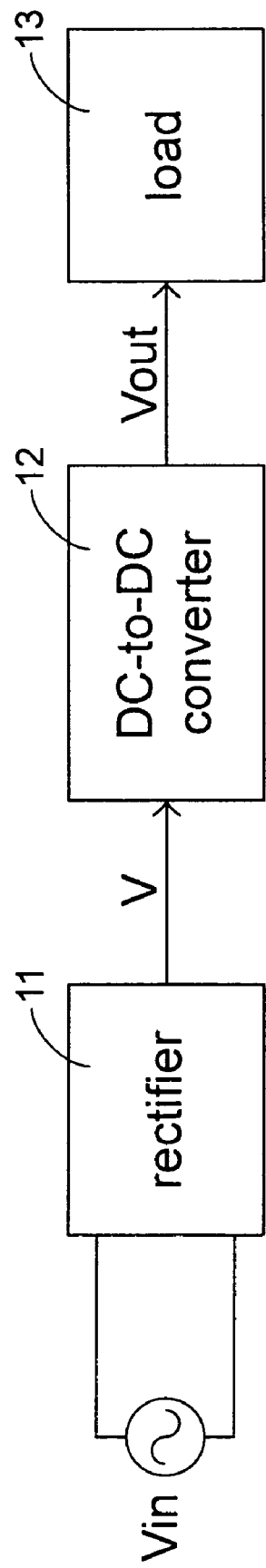
FIG. 1(a) is a functional block diagram of a conventional power supply apparatus.
Figure 1B:
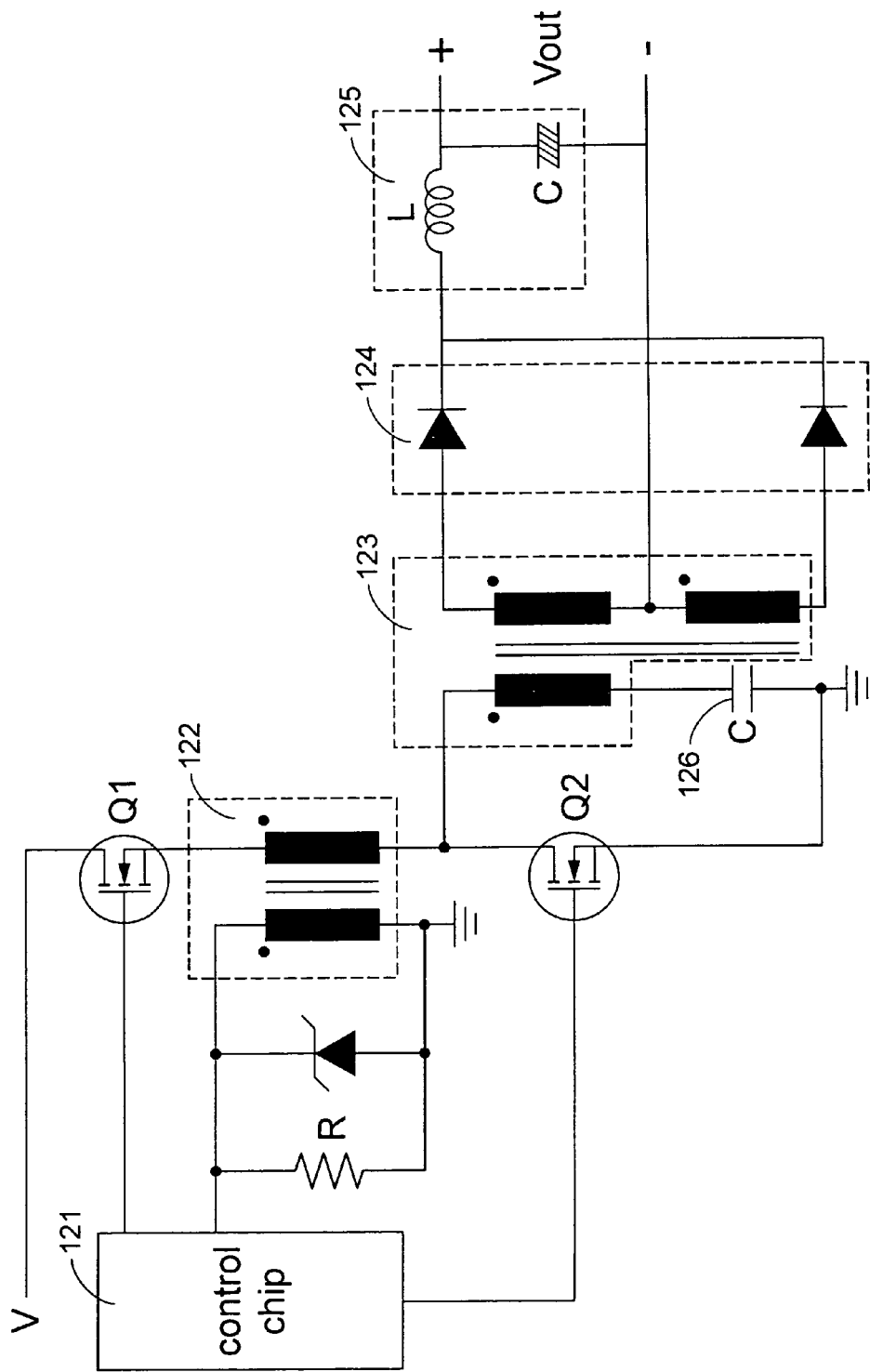
FIG. 1 (b) is a circuit diagram of a DC-to-DC converter in FIG. 1(a)
FIG. 1(c) is a timing diagram of waveform illustrating the current flowing through the capacitor at the primary winding of the transformer in the circuit of FIG. 1(b)
FIG. 1(d) is a circuit diagram of another DC-to-DC converter in FIG. 1(a)
Figure 1C:
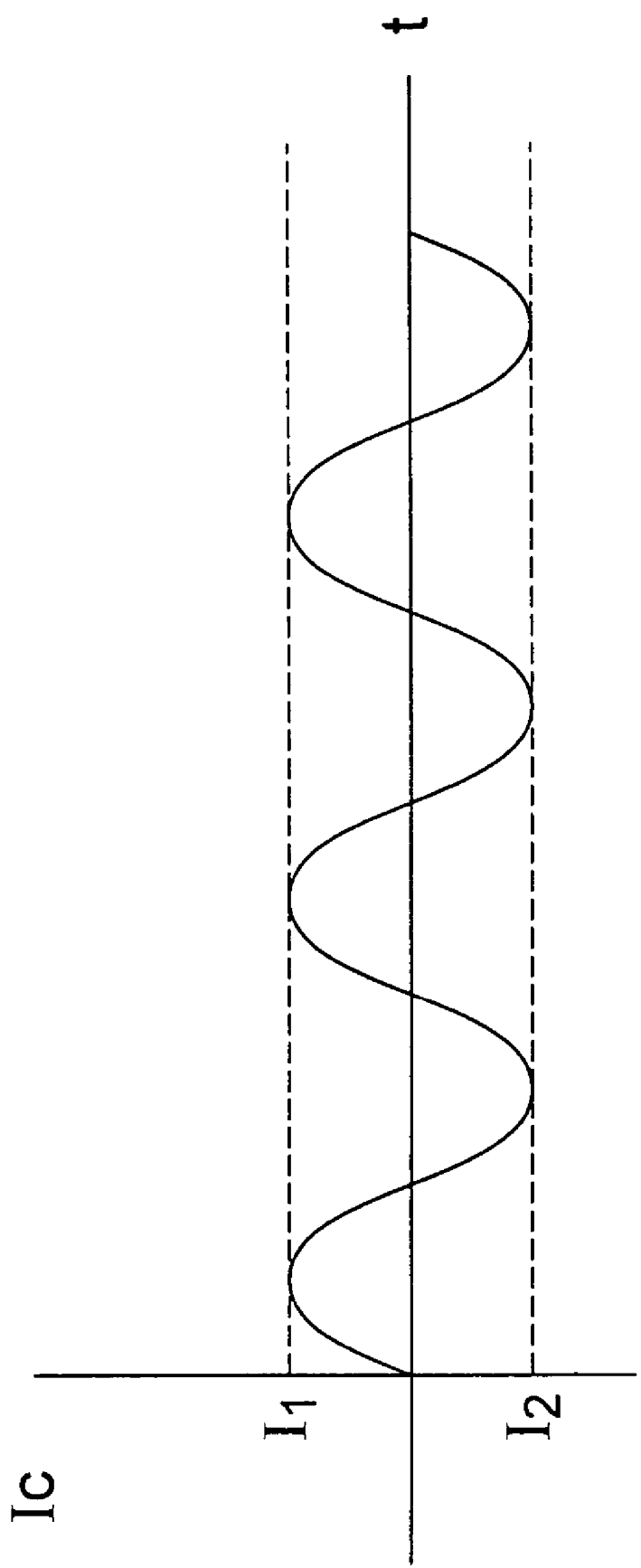
Figure 1D:
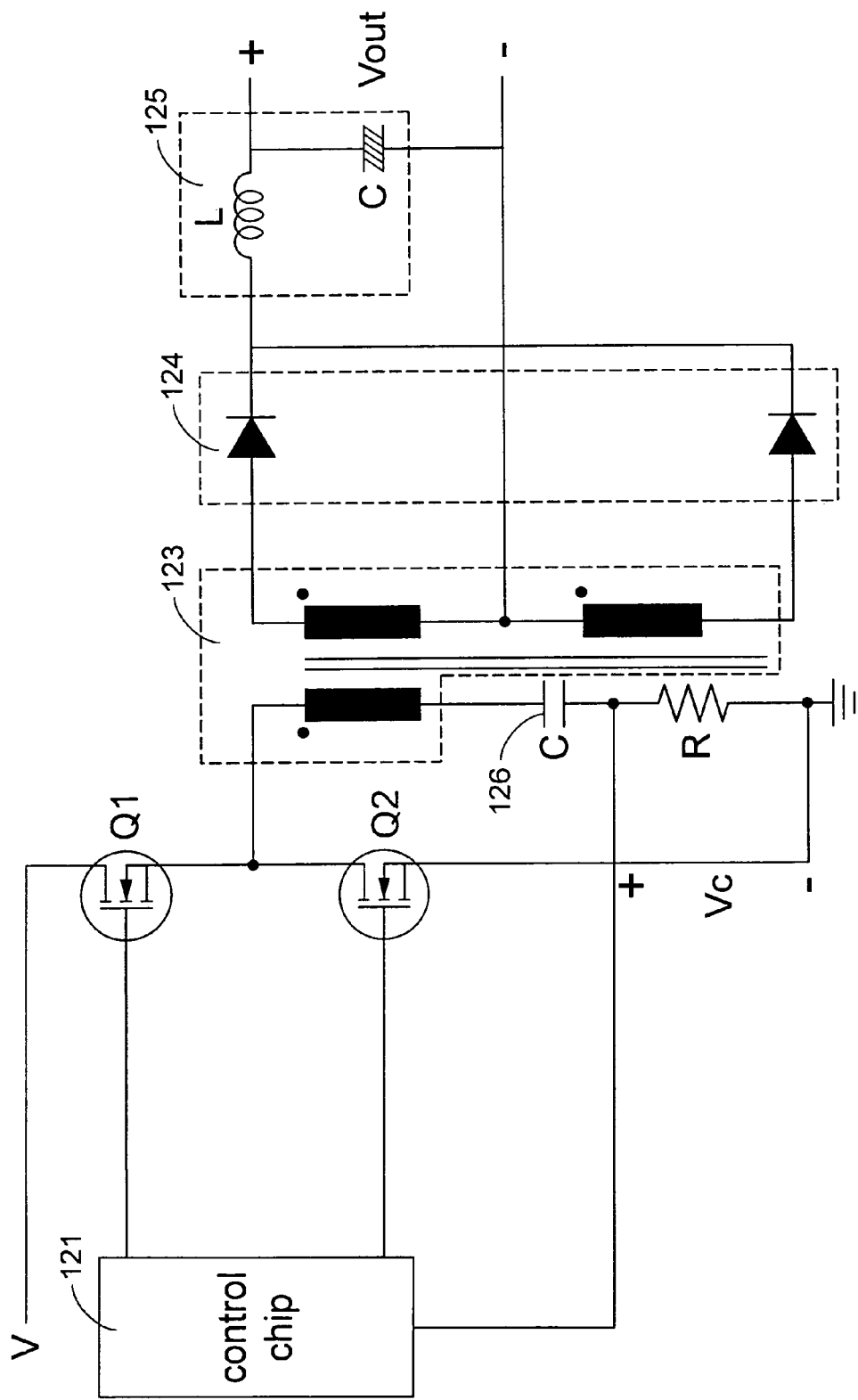

As shown in FIG. 1(c), when the current flowing through the capacitor 27 is below the peak value $I_1$, the first switching transistor 221 is conducted and the second switching transistor 222 is kept shut. Meanwhile, the high DC voltage Vin will charge the capacitor 27 via the first switching transistor 221, the current detecting circuit 23, and the primary winding of the transformer 24. Whereas, when the current flowing through the capacitor 27 reaches the peak value $I_1$, the control circuit 21 will turn off the first switching transistor 221 but turn on the second switching transistor 222. Meanwhile, the capacitor 27 is discharged via the primary winding of the transformer 24 and the second switching transistor 222 until the current flowing through the capacitor 27 is below the peak value $I_2$. Again, the first switching transistor 221 is conducted and the second switching transistor 222 is shut to charge the capacitor 27, and successively the first switching transistor 221 is shut and the second switching transistor 222 is conducted to discharge the capacitor 27. The charging/discharging procedures are continuously performed, thereby resulting in current variation at the primary winding of the transformer 24. Accordingly, a low voltage signal V is produced from the secondary winding of the transformer 24.

In this embodiment, the rectifier 25 and the filter 26 are electrically connected to the secondary winding of the transformer 24. After the low voltage signal V is rectified and filtered by the rectifier 25 and the filter 26, respectively, the low DC voltage Vout in proportion to the turn ratio of the transformer 24 is provided to a load (not shown) such as an electrical appliance.

In conclusion, since the current detecting circuit of the present invention principally comprises a filter, a rectifier and a differentiator, the fabricating cost is reduced when compared with the conventional current transformer. Furthermore, since no resistor is connected to the energy storage element in series, the energy loss is also minimized, thereby increasing the performance of the overall product.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A current detecting circuit for use in a power converter having a control circuit, a switching circuit, a transformer and an energy storage element, said current detecting circuit comprising:
   a filter electrically connected to said energy storage element for receiving a voltage signal from said energy storage element and filtering said voltage signal to obtain an alternating voltage change value;
   a rectifier electrically connected to said filter for rectifying said alternating voltage change value to obtain a half-sine wave voltage change value; and
   a differentiator electrically connected to said rectifier and said control circuit for performing a differential operation on said half-sine wave voltage change value to obtain a current change value of said energy storage element, wherein said current change value is compared with a predetermined reference value stored in said control circuit so as to dynamically control the switching status of said switching circuit according to the comparing result.

2. The current detecting circuit according to claim 1 wherein said power converter is a DC-to-DC converter.

3. The current detecting circuit according to claim 1 wherein said power converter is a half-bridge converter.

4. The current detecting circuit according to claim 1 wherein said energy storage element is a capacitor.

5. The current detecting circuit according to claim 1 wherein said filter is a high pass filter (HPF).

6. The current detecting circuit according to claim 5 wherein said high pass filter (HPF) includes a capacitor and a resistor.

7. The current detecting circuit according to claim 1 wherein said rectifier is a diode.

8. The current detecting circuit according to claim 1 wherein said differentiator is an operational amplifier.

9. A power converter comprising:
   a switching circuit receiving a first voltage;
   a transformer electrically connected to said switching circuit;
   an energy storage element electrically connected to said transformer;
   a control circuit electrically connected to said switching circuit; and
   a current detecting circuit comprising:
      a filter electrically connected to said energy storage element for receiving a voltage signal from said energy storage element and filtering said voltage signal to obtain an alternating voltage change value;
      a rectifier electrically connected to said filter for rectifying said alternating voltage change value to obtain a half-sine wave voltage change value; and
      a differentiator electrically connected to said rectifier and said control circuit for performing a differential operation on said half-sine wave voltage change value to obtain a current change value of said energy storage element, wherein said current change value is compared with a predetermined reference value stored in said control circuit so as to dynamically control the switching status of said switching circuit according to the comparing result, and a second voltage is produced from the transformer in response to said current change value.

10. The power converter according to claim 9 wherein said transformer comprising:
   a primary winding electrically connected to said switching circuit, said energy storage element and said current detecting circuit; and
   a secondary winding producing a second voltage.

11. The power converter according to claim 10 further comprising another rectifier and another filter electrically connected to the secondary winding of said transformer so as to rectify and filter said second voltage and produce an output voltage.

12. The power converter according to claim 9 wherein said energy storage element is a capacitor.

13. The power converter according to claim 12 wherein said switching circuit comprises a first switching transistor and a second switching transistor, wherein when said first switching transistor is conducted but said second switching transistor is shut, said capacitor is charged, and when said first switching transistor is shut but said second switching transistor is conducted, said capacitor is discharged.

14. The power converter according to claim 9 wherein said filter is a high pass filter (HPF).

15. The power converter according to claim 14 wherein said high pass filter (HPF) comprises a capacitor and a resistor.

16. The power converter according to claim 9 wherein said rectifier is a diode.

17. The power converter according to claim 9 wherein said differentiator is an operational amplifier.

* * * * *